United States Patent [19]

Cleveland et al.

[11] 4,454,379

[45] Jun. 12, 1984

[54] SEMI-CONDUCTIVE, MOISTURE BARRIER SHIELDING TAPE AND CABLE

[75] Inventors: William K. S. Cleveland, Roselle, N.J.; William J. Pabis, Hagaman, N.Y.

[73] Assignee: General Electric Company, Schenectady, N.Y.

[21] Appl. No.: 380,584

[22] Filed: May 21, 1982

[51] Int. Cl.³ .............................................. H01B 7/18
[52] U.S. Cl. ................... 174/107; 156/308.6; 174/36; 174/106 SC; 174/119 C
[58] Field of Search ................. 174/36, 106 SC, 107, 174/119 R, 119 C; 428/389; 156/308.6, 308.8

[56] References Cited

U.S. PATENT DOCUMENTS

| | | | |
|---|---|---|---|
| 2,551,591 | 5/1951 | Foord | 156/308.6 X |
| 3,220,897 | 11/1965 | Conley et al. | 428/606 |
| 3,233,036 | 2/1966 | Jachimowicz | 174/107 |
| 3,272,912 | 9/1966 | Jachimowicz | 174/36 |
| 3,454,376 | 7/1969 | Luce et al. | 428/607 |
| 3,472,692 | 10/1969 | Isshiki | 174/106 SC |
| 3,585,010 | 6/1971 | Luce et al. | 428/608 |
| 3,586,756 | 6/1971 | Garner et al. | 174/36 X |
| 3,679,503 | 7/1972 | Dembiak et al. | 174/107 X |
| 3,728,177 | 4/1973 | Caule | 156/308.8 X |
| 3,790,694 | 2/1974 | Portinari | 174/36 X |
| 3,792,192 | 2/1974 | Plate | 174/106 SC X |
| 3,983,286 | 9/1976 | Arsac | 428/389 |
| 4,049,904 | 9/1977 | Hori et al. | 174/107 |
| 4,092,452 | 5/1978 | Hori et al. | 174/107 X |
| 4,125,739 | 11/1978 | Bow | 174/107 X |
| 4,322,574 | 3/1982 | Bow et al. | 174/107 |

FOREIGN PATENT DOCUMENTS 2084385A  4/1982  United Kingdom ................. 174/36

*Primary Examiner*—J. V. Truhe
*Assistant Examiner*—Morris H. Nimmo
*Attorney, Agent, or Firm*—Hedman, Gibson, Costigan & Hoare

[57] ABSTRACT

New and improved shielding tapes for use in electric cable construction are disclosed and include a metallic foil treated on both sides with a conductive adhesion promoting material and surrounded on both sides with a continuous layer of a semi conductive polymer material. The tapes provide an improved electrostatic shield and moisture barrier for cables destined to be utilized in extended underground installation applications.

6 Claims, 4 Drawing Figures

SEMI-CONDUCTIVE, MOISTURE BARRIER SHIELDING TAPE AND CABLE

BACKGROUND OF THE INVENTION

The present invention relates to electrical cable insulation. More particularly it relates to a new and improved shielding tape for use in insulating underground cables which provides an electrostatic shield and moisture barrier to the cables.

Polyethylene is widely used as high-frequency insulation on power and coaxial cables and as primary insulation on telephone cables, multiconductor control cables, television lead-in wire and appliance wire. The characteristics of polyethylene include: good electrical properties; chemical resistance to solvents, acids and alkalies; toughness and flexibility even at low temperatures; good barrier properties; adaptability to many processing techniques; and relatively low cost.

A problem arises with polyethylene insulated conductors and cables where long-term underground installation is required. When cables such as telephone and high voltage power cables are installed under ground by being buried directly in the soil, the outer polyethylene jackets of such cables may be subjected to damage from the rigors of installation, rocks, rodents, lightning, frost and water. Prolonged exposure to the corrosive effects of subterranean percolating water has proved to be a major problem. The manufacture and installation of underground cables is so expensive that insulations which can withstand environmental assault for more than thirty years are particularly desirable. Polyethylene jackets alone have not proved satisfactory to the task.

More recently, it has become known that improved underground cables may be provided by assembling insulated conductors in a core and surrounding it first with a shield and then a polyolefin jacket. The term "shield or shielding tape" as used herein means a relatively thin layer of any metal, bare or coated, which can provide mechanical protection and electrostatic and electromagnetic screening for the conductors in the core of electrical power and communications cables. The term is also referred to in the art as metallic strip, metallic foil, metallic screen, metallic barrier, metallic sheath, shielding material, etc., which terms are often used interchangeably.

In order to improve the corrosion resistance of the shielding tape of bare metal, a special adhesive polyethylene film may be applied to cover one or both sides of the metallic strip. Such an adhesive polyethylene film is disclosed in U.S. Pat. No. 3,233,036, wherein a graft copolymer of polyethylene and a monomer with a reactive carboxyl group, such as acrylic acid or acrylic acid ester, is applied to both sides of an aluminum foil tape. These laminated tapes are preferable to uncoated metallic tapes or to plain polyethylene coated tapes because, although polyethylene films generally satisfy the requirements of electrical resistivity and resistance to chemicals and moisture, they develop only a mechanical bond with the metallic tapes based on friction-type adhesion, and delamination of polymer film from the metal tape does occur. The carboxyl components of the copolymer, on the other hand, have the property of forming chemical bonds with the metal to provide improved bonding of film to metal.

In U.S. Pat. No. 3,586,756, a more economically attractive alternative shielding tape is disclosed having a protective film layer in the form of a low cost homopolymer with a concentration of reactive groups (carboxyl) in the part of the layer adjacent the metallic foil and only in that part of the protecting layer. Other shielding tapes having similarly improved resistance to delamination are described in U.S. Pat. No. 4,049,904 and U.S. Pat. No. 4,092,452.

More recently, the demand for higher voltage cables has increased. In power cable applications for transmitting relatively high voltage loads such as 5 kV and above, ionization resistance, sometimes referred to as corona resistance, may become a problem because it may lead to the premature breakdown of the cable insulation. Accordingly, there is currently a need for insulation having superior properties over extended exposure to high voltage stess.

It has presently been discovered that improved polyolefin based cable shielding tapes incorporating a voltage gradient (an electrostatic shield) and a moisture barrier, and having resistance to delamination may be prepared if the polyolefin is rendered semiconductive and the metallic foil is pre-treated with certain adhesion promoting materials.

SUMMARY OF THE INVENTION

In accordance with the subject invention, new and improved shielding tapes for electrical cables are provided in the form of a plastic laminated metallic foil, wherein said foil laminate comprises:

(a) a metallic foil selected from the group consisting of aluminum, copper, iron, steel, silver, gold and tin;

(b) a first layer thinly coating at least one side of said metallic foil of an electrically conductive adhesion promoting material; and (c) a second outer layer adhered to said metallic foil and adhered to and covering said first layer of a semiconductive polymer material.

The invention also relates to improved electrical cables comprising a core including insulated conductor means, a plastic foil laminate as described above completely surrounding the circumference of said core and an outer jacket of insulation over the outside of the laminate layer of a polyolefin extrusion material.

In a preferred embodiment, the metallic foil is a copper foil of from about 0.001" to about 0.01" thickness. The coating of adhesion promoting material is a thin layer copper-copper oxide particles encapsulated by a metallic copper coating. The preferred semi-conductive polymer material is a polyethylene treated with carbon black and having an electrical resistivity of from about 50 to about 10,000 ohm-cm.

Other objects and advantages of the subject invention will become apparent from the following detailed description taken in conjunction with the drawings in which:

DETAILED DESCRIPTION OF THE INVENTION

Figure 1:
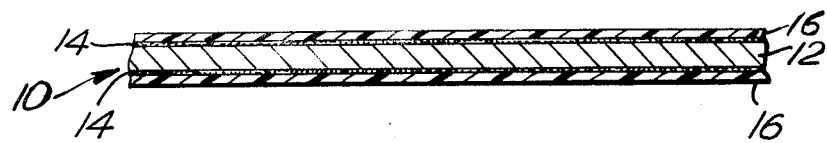
FIG. 1 is an enlarged cross sectional view of the new and improved plastic metallic foil laminate shielding tape of the subject invention.

Referring to FIG. 1, an enlarged cross sectional view of the new and improved metallic foil laminate shielding tape 10 of the subject invention is shown. In the preferred embodiment depicted therein, shielding tape 10 includes a central metallic foil layer 12 which has been coated on both sides with an electrically conductive adhesion promoting material 14. An outer coating layer of a semiconductive polymer film 16 covers both sides of foil layer 12 and is firmly adhered thereto with the assistance of adhesion promoter 14.

The metallic foil 12 for use with the subject invention may be a thin layer of any metal having good electrical and mechanical properties, such as for example, aluminum, copper, iron, steel, silver, gold, tin, aluminum alloys, alloy-clad aluminum, bronze, tin-free steel, tin plate steel, aluminized steel, stainless steel, copper-clad stainless steel, terneplate steel, lead, magnesium, or the like.

The metallic foil 12 functions as mechanical moisture barrier and serves to protect the conductors within the core of a cable from the effects of ground water. The thickness of the metallic foil is an important concern because there is an inverse relationship between the thickness and the number of pinholes through the foil that a given length of metallic foil will have. It is only necessary to increase the thickness of the foil to decrease its permeability to moisture to the vanishing point. For example, foil having a thickness of 0.00035 in. has been found to have pinholes in 100% of a 12-in square sample sheet. This is reduced to about 8% at a thickness of 0.001 in., whereas foils which measures 0.0015 in. or more in thickness are essentially pinhole-free and are therefore impermeable to moisture. For the purposes of the subject invention, metallic foil 12 may range from at least 0.001 in. to about 0.05 inches or more in thickness. However, metallic foils having thicknesses from about 0.001 in. to about 0.01 inches may be used. The foils may be as thick as desired, however the thicker the foil, generally the less malleable it will be, which may prove troublesome when wrapping the foil around the core of the electrical cable. Preferred foils include copper foils ranging from 0.001 in. to 0.005 inches in thickness.

Figure 2:
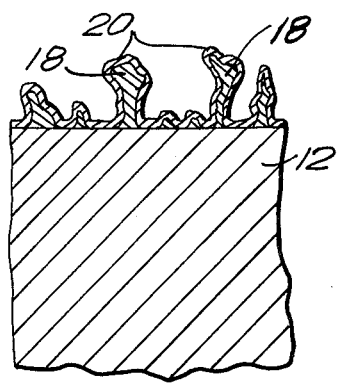
FIG. 2 is a greatly magnified and exaggerated illustration of a cross sectional portion of the metallic foil tape treated with the electrically conductive adhesion promoting material in accordance with the subject invention.

The electrically conductive adhesion promoting material 14 for use with the subject invention is a surmounting strata of copper-copper oxide particles deposited in random clusters to form a plurality of projections from the surface of the metallic foil substrate. The copper-copper oxide projections effectively increase the surface area of the supporting metallic foil surface. A coating of metallic copper coacts in surmounting in intimate secure relation with the first strata as an encapsulating coating to maintain the desired configuration of the surface projections intact. More particularly, and as illustrated in FIG. 2, the electrically conductive adhesion promoting material 14 comprises a first layer of copper-copper oxide particles 18 deposited in random clusters to form a plurality of projections from the surface of the metallic foil substrate. A thin coating of metallic copper 20 is deposited thereover in such manner as to encapsulate copper-copper oxide particles 18 and thereby firmly adhere them to the surface of metallic foil 12. The adhesivity of a copper foil having the irregular surface described, by which is meant its ability to be adhered to another independent body, is greatly increased over untreated copper foils. The nodularized surface of the treated copper foil provides increased surface area for adhesive bonding with an outer resinous coating. The nodules also provide an improved mechanical bond between a resinous outer coating and the copper foil.

The adhesion promoting materials 14, comprising the particle clusters 18 and the encapsulating coating 20, are preferably applied by electrodeposition. Generally, the electrodeposition process for applying the adhesion promoter 14 is unusual. It consists of electrodepositing copper from a sulphuric acid-copper sulphate solution, employing excessive current densities and regulating the concentration of other ions, such as halide ions, in the plating bath, to deposit on the surface of the copper foil a lightly adhering powder of copper which is partially oxidized. These are the copper-copper oxide particles referred to above. These particles pile up in random clusters on the surface of the copper to form projections of desired configuration from the surface of the foil. The electroplating conditions are returned to more normal conditions, i.e., a much lower current density, such as that used in depositing sound copper films, to deposit over the copper-copper oxide projections an encapsulating coating of copper metal which serves to maintain the desired projection configuration on the copper foil substrate.

More particularly, the copper-copper oxide, copper plated nodules may be deposited from an electrolytic bath comprising:

| | |
|---|---|
| chloride ppm | 30-35 |
| copper (calc. as metal), grams per liter | 20-25 |
| sulfuric acid, grams per liter | 65-75 |
| animal hide glue (low fat), | 0.5-1.0 |
| demineralized water | balance |

The copper foil serves as the cathode and it is preferred to use an insoluble anode, such as a lead plate, which is non reactive with the bath. Current densities ranging from 75 to 250 amperes per square foot, for a period ranging from 5 to 20 seconds are applied to form the surface projections. Lower current densities of about 20 to 150 amperes per square foot are applied for a period of from 15 to 600 seconds to deposit the encapsulating coating. The copper foil is passed through the bath at a rate of about 7.5 feet per minute and temperature of the bath should remain at room temperature or substantially between 70°–80° F.

The current density required for producing the adhesion promoting surfaces for use in the subject invention is dependent upon the solution concentration, degree of agitation, and operating temperature of the copper sulfate plating bath. For example, if the temperature of the plating solution is raised and agitation is provided, the current density used for the surface conditioning process would have to be raised accordingly. More particular details and description of these adhesion promoting coatings for metallic foils and surfaces are provided in U.S. Pat. No. 3,220,897; U.S. Pat. No. 3,292,109; U.S. Pat. Nos. 3,454,376; and 3,585,010, all of which are incorporated herein by reference. Pre-adhesion promoter treated copper foils, suitable for use with the subject invention are commercially available from Gould Inc., Rolling Meadows, Ill.

Although the subject invention has thus far been described wherein the adhesion promoting material 14 is an electrically conductive material, and more particularly a copper foil with a copper coated, copper-copper oxide nodularized surface, other non-conductive adhesion promoting materials may be used in conjunction with metal foils with or without a nodularized surface. Where non-conductive adhesion promoters are used, care should be taken to apply them to the foil in a thin and even manner, without the formation of air bubbles or pockets, so as not to detrimentally affect the ionization resistance of the overall plastic foil laminate. Suitable non-conductive adhesion promoting materials which may find use with the subject invention include an adhesive composed of phenol-formaldehyde condensate and butadiene-acrylonitrile rubber in a ratio of 90/10 and having 100 parts wood flour admixed therewith; mixed poly(vinyl butyral)-(phenol-formaldehydes); epoxy resins cured with various polyamine hardening agents; various alkyd resins such as a maleic anhydride-ethylene glycol polyester and such polyesters dissolved in styrene and copolymerized in place with peroxide initiators and heat. Other suitable adhesives will suggest themselves to those skilled in the art.

The semiconductive polymer film may be any polymer used in electrical insulation applications which has been rendered semiconductive by incorporation of an electrically conductive filler such as silver, aluminum or carbon. The polymer material may be polyethylene, polypropylene, polypropylene-modified polyethylene, polyvinyl chloride, or copolymers of polyethylene, such as ethylene-acrylic acid copolymer and the like.

The preferred semiconductive polymer compositions are well known in the art and are comprised of low molecular weight, high density polyethylene which has incorporated therein a loading of carbon black from 4 to 30% by weight of the composition. Polymer compositions comprising polyethylene and approximately 10% by weight carbon black are particularly preferred. The amount of carbon black added should be sufficient to provide polymer films having volume electrical resistivities of from about 50 to about 10,000 ohm-cm, which is preferred, although other resistivities may be more suited to a particular use.

The thickness of the layer of polymer film adhered to both sides of the metallic foil may vary from 0.001" to 0.05" inches. Preferred thicknesses vary from 0.001 to about 0.004 inches. An increase in the thickness of the polymer coating layers to 0.05" or more causes the tape to be generally less flexible than desired and rippling and buckling may occur during installation of the cable.

The new and improved plastic foil laminates of the subject invention may be prepared by several conventional techniques well known in the art. For example, pelletized polyethylene and carbon black may be compounded in the mixing chamber of a screw extruder, such as a Wayne extruder. The compounded polymer passes from an elongated flat extrusion die onto the first roll of a conventional three or four roll calender. The hot extrudate passes through the nip formed between the first two heated calendar rolls to a second metering nip between the second and third rolls. The metallic foil also passes through the nip between the second and third rolls and the temperatures of the rolls and the pressures applied at the nip between the second and third rolls are such that the polymer film becomes adhered to the metallic foil. The heated laminate so formed is passed over several cooling rolls before being wound onto a winding roll. The foil having one side laminated with the semiconductive polymer film is reversed and the process is repeated to coat the other side of the metallic foil. Four roll calendars are capable of calendering the film to both sides of the metallic foil in one step. Typical three and four roll calendar machines and processes are suitably illustrated and described in the article "Calendering of Thermoplastic Materials" from the Encyclopedia of Polymer Science and Technology, Interscience Vol. 3, 1967, p. 802 et seg., incorporated herein by reference.

Generally the heating chamber of the Wayne extruder should be set at temperatures of 350° F. to 375° F., with the die temperature approximately set at from 250° F. to about 325° F. The temperatures of the three calendering rolls should be set at approximately the following temperatures: Roll 1—150° C.; Roll 2—135° C.; Roll 3—110° C.

Another method of preparing the new and improved plastic metallic foil laminate of the subject invention involves using a calender to laminate the electrically conductive adhesion promoter pre-treated metallic foil to a preformed blown polymer film. In accordance with this method, the carbon black and polyethylene are compounded in the mixing chamber of an extruder which is vertically oriented. In a manner very similar to conventional glass blowing technique, a parison or bulb of molten polyethylene is produced at the die head which is then expanded by a flow of nitrogen gas in the interior to form a thin-walled bubble. The size of the bubble and wall thickness can be regulated by varying the rate of flow of the inflation gas and the rate of flow of the extrudate. Generally, bubbles are made up to 12 feet in diameter. The blown polyethylene films of this size are air-cooled as they are blown by a plurality of circumferentially spaced air jets at the outside of the bubble. After an elongated bubble is formed and cooled the top and bottom nub of the parison are cut away and one side of the bubble is slit to form a large sheet of flat polymer film. Several sheets of the film so formed may be discretely fused along one edge of each by heat and wound upon a roll. The pre-formed blown polymer film and the preheated metallic foil are then laminated in a heated calender in the same manner as described above, the only difference being that in this method the extrusion of the flattened polymer film is prepared in a distinct and separate step by a different method.

A third and the preferred method of preparing the laminates of the subject invention is to employ a conventional heated laminator. In the heated laminator a blown polymer film and the metallic foil substrate are fed from separate preheated rolls to a common nip and are then passed over a cooled rubber covered roll. The rubber roll is positioned such that the film and foil pass around its circumference under tension. Tension is provided by an offset steel embossing roll which forms a nip at the other side of the rubber coated roll. As the coated foil passes around the circumference of the rubber coated roll, the roll presses the metallic foil into the hot film to a depth determined by tension placed on film and foil. As before, the one sided laminate is passed through the laminator for a second time to coat the other side of the metallic foil. Of course, as described previously the polymer film can be laminated to both sides in a single step.

The new and improved plastic metallic foil laminate shielding tapes of the subject invention are for use as an integral element in power and communications cable construction. The plastic metallic foil laminate tape is disposed around a central core of individually insulated conductors, and between said core and an outer jacket of plastic insulating material.

Figure 3:
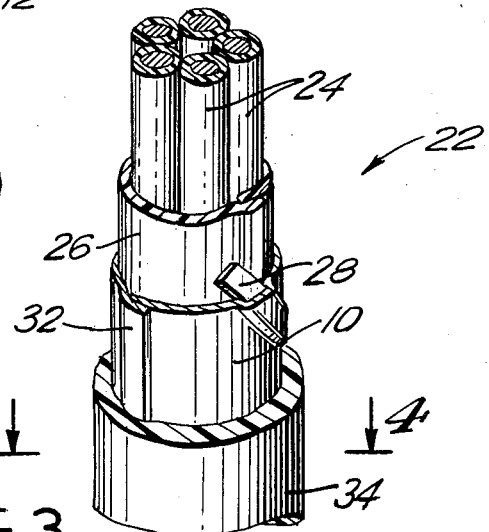
FIG. 3 is a cut-away perspective view of an end of an electrical cable with a plurality of insulated conductors in the core, the new and improved plastic laminated metallic foil shield tape, and a plastic outer jacket.
Figure 4:
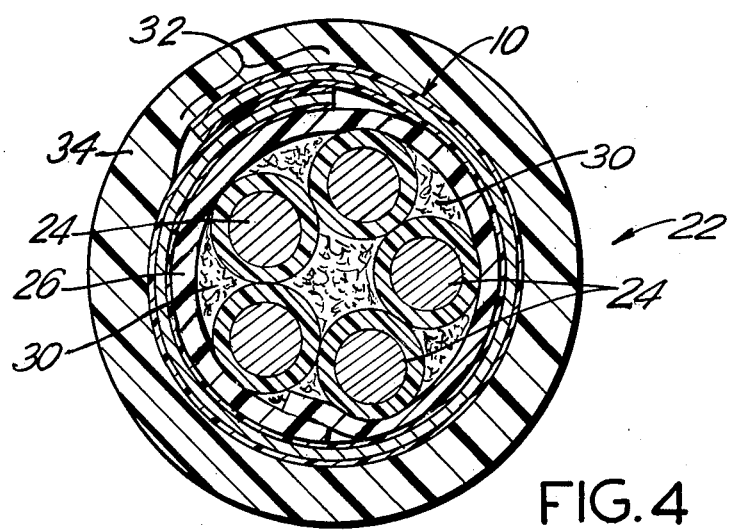
FIG. 4 is an enlarged cross sectional view of an electrical cable shielded with the new and improved plastic metal foil laminate of the subject invention, taken along line 4—4 of FIG. 3.

More particularly, referring to FIGS. 3 and 4, a representative electric Cable 22 is shown. Electrical Cable 22 includes an inner core of a plurality of insulated conductors 24 (e.g. plastic coated copper wires) bundled in a plastic core wrap 26 of polypropylene or polyethylene terephthalate which is securely bound with a binder tape 28. If desired, space fillers 30 of natural fibers or foamed plastic may be used to provide a substantially circular core assembly for enclosing within core wrap 26. The plastic metallic foil laminate shielding tape 10, as depicted in FIG. 1, is preferably made to enclose the bound core assembly by cigarette wrapping of the tape 10 around the core. Cigarette wrapping means that the tape 10 is made to form a longitudinally folded tube with an overlapping seam 32 that may be hermetically sealed by heat or other means, sealing the semiconductive plastic coating 16 of the shielding tape 10 together in overlapping seam 32 during cable manufacture. An outer plastic jacket 34 preferably of polyethylene is extruded over the shield 10 and is advantageously bonded to the same.

In the preferred embodiments described above, the new and improved shielding tape of the subject invention is a laminate having both sides of the metallic foil, coated with adhesion promoting material and semiconductive polyethylene film. The invention should be understood to include tapes with only one side of the metallic foil coated in accordance with the subject invention. In addition, the polymer film adhered to both sides of the metallic foil need not be the same. For example, the invention includes a metallic foil tape pretreated with an electrically conductive adhesion promoting material and having a semiconductive polyethylene film layer adhered to one side and a semiconductive polypropylene film layer adhered to the other side thereof. Further, the tapes may be incorporated in cable construction by means other than cigarette wrapping. For example, the tapes may be wrapped in a helical half-lap fashion and then hermetically sealed along the points of overlap to form a continuous electrostatic and moisture barrier.

The following Example is offered to better illustrate the subject invention.

EXAMPLE 1

A copper plated, copper-copper oxide adhesion promoter pre-heated copper foil having a gauge thickness of 0.0075 and having the dimensions 2½ inches by 500 ft. was selected.

A semiconductive polyethylene film of Irricon I (9437X) available from Dupont having a carbon black content of approximately 10% by weight was prepared by blow extrusion having a thickness of about 0.002 to 0.003 inches.

The semi-conductive polymer film and the pretreated copper foil were loaded on a high speed laminator with each of the rolls preheated to about 300° F. The laminator was set at a laminating temperature of approximately 400° F. and at a laminating rate of 12-15 feet/min. The laminator was turned on and the metallic foil having one side laminated with plastic was collected on a roll. The roll was reversed and the other side of the foil was run through the laminator under the same conditions to adhere a second layer of polyethylene from to the other side of the foil.

The semiconductive polyethylene-copper foil laminate prepared was wrapped around the core of an electric cable and showed improved moisture resistance and improved corona resistance under high voltage stress testing.

The foregoing patents and publications are all incorporated herein by reference. Although the present invention has been described with reference to preferred embodiments, it is apparent that modifications and changes may be made therein by those skilled in the art without varying from the scope and spirit of the subject invention as defined by the appended claims.

What is claimed is:

1. A plastic laminated metallic foil useful as an electrostatic and moisture proof shielding tape for electrical cables, said foil laminate comprising:
    (a) a metallic foil selected from the group consisting of aluminum, copper, iron, steel, silver, gold and tin;
    (b) a first layer of an electrically conducting adhesion promoting material thinly coating both of the major surfaces of said metallic foil; and
    (c) a second outer layer over said first layer adhered to both major surfaces of said metallic foil of a semiconductive polymer material, whereby a continuous, polymer encased metallic foil laminate is provided.

2. A plastic laminated metallic foil as recited in claim 1 wherein said metallic foil is a copper foil.

3. A plastic laminated metallic foil as recited in claim 2 wherein said adhesion promoting material is electrically conductive and comprises:
    a first layer of copper-copper oxide particles deposited in random clusters to form a plurality of projections from said foil surfaces; and
    a second layer of a thin metallic copper coating for encapsulating and maintaining said projections intact thereon, whereby a metallic foil having increased surface area for adhesive bonding and having an irregular surface for mechanical bonding is provided.

4. A plastic laminated metallic foil as recited in claim 1 wherein said metallic foil is from 0.001 inches to 0.01 inches in thickness.

5. A plastic laminated metallic foil as recited in claim 1 wherein said semi-conductive polymer material is polyethylene containing 10% by weight carbon black.

6. An electrical cable comprising a core including a plurality of insulated conductor means, a laminated shield completely surrounding the circumference of said core, and an outer jacket of insulation over the outside of said shield of a polyolefin extrusion product said laminated shield comprising:
    (a) a metallic foil selected from the group consisting of aluminum, copper, iron, steel, silver, gold and tin;
    (b) a first layer of an electrically conducting adhesion promoting material thinly coating both of the major surfaces of said metallic foil; and
    (c) a second outer layer over said first layer adhered to both major surfaces of said metallic foil of a semiconductive polymer material, whereby a continuous, polymer encased metallic foil laminate is provided.

* * * * *